US011171958B1

(12) United States Patent
Davey

(10) Patent No.: US 11,171,958 B1
(45) Date of Patent: Nov. 9, 2021

(54) SECURE SESSION SHARING BETWEEN COMPUTING DEVICES

(71) Applicant: United Services Automobile Association (USAA), San Antonio, TX (US)

(72) Inventor: Richard Davey, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 195 days.

(21) Appl. No.: 16/030,974

(22) Filed: Jul. 10, 2018

(51) Int. Cl.
*H04L 29/06* (2006.01)
*G06F 21/35* (2013.01)
*G06F 21/36* (2013.01)
*H04L 12/06* (2006.01)

(52) U.S. Cl.
CPC .............. *H04L 63/10* (2013.01); *G06F 21/35* (2013.01); *G06F 21/36* (2013.01); *H04L 12/06* (2013.01); *H04L 63/08* (2013.01)

(58) Field of Classification Search
CPC ......... H04L 63/10; H04L 12/06; H04L 63/08; H04L 2463/062; H04L 2463/081; H04L 2463/082; G06F 21/35; G06F 21/36; G06F 21/31; H04W 48/18
See application file for complete search history.

(56) References Cited

U.S. PATENT DOCUMENTS

| | | | |
|---|---|---|---|
| 6,470,453 B1 | 10/2002 | Vilhuber | |
| 6,782,080 B2 | 8/2004 | Leivo et al. | |
| 7,419,097 B2 | 9/2008 | Lee et al. | |
| 7,611,048 B1 | 11/2009 | Warren et al. | |
| 7,686,213 B1 | 3/2010 | Ramachandran | |
| 7,805,362 B1 | 9/2010 | Merrell et al. | |
| 7,861,922 B2 | 1/2011 | Lee et al. | |
| 7,992,776 B1 | 8/2011 | Ramachandran et al. | |
| 8,474,028 B2 | 6/2013 | Kulkarni et al. | |
| 9,010,672 B2 | 4/2015 | Bedak et al. | |
| 9,148,897 B2* | 9/2015 | Piqueras Jover | H04N 21/6131 |
| 9,203,824 B1* | 12/2015 | Nunn | H04L 63/08 |

(Continued)

OTHER PUBLICATIONS

Arora et al., "Secure Session Key Sharing Using Symmetric Key Cryptography," 2018 International Conference on Advances in Computing, Communications and Informatics (ICACCI) Year: 2018 | Conference Paper | Publisher: IEEE.*

(Continued)

*Primary Examiner* — Roderick Tolentino
(74) *Attorney, Agent, or Firm* — Fish & Richardson P.C.

(57) ABSTRACT

Methods, systems, and apparatus, including computer programs encoded on a computer storage medium, for authenticating a first computing device to access a secure account. Receiving a request from a second computing device to be authorized to access the secure account. Providing, to the second computing, first data that represents a first machine-readable code for presentation by the second computing device. Receiving, from the first computing device, second data that represents a second machine-readable code as read by the first computing device. Authorizing the second computing device to access the secure account in response to determining that the second data accurately represents the first machine-readable code as sent to the second computing device.

19 Claims, 6 Drawing Sheets

(56) References Cited

U.S. PATENT DOCUMENTS

| | | |
|---|---|---|
| 9,258,286 B1 | 2/2016 | Voutour |
| 9,742,756 B1 | 8/2017 | Voutour |
| 9,979,725 B1* | 5/2018 | Liu ................... H04W 12/08 |
| 10,440,004 B1 | 10/2019 | Voutour |
| 2004/0221045 A1 | 11/2004 | Joosten et al. |
| 2005/0078851 A1 | 4/2005 | Jones et al. |
| 2005/0102233 A1 | 5/2005 | Park et al. |
| 2005/0273442 A1 | 12/2005 | Bennett et al. |
| 2006/0016884 A1 | 1/2006 | Block et al. |
| 2008/0040276 A1 | 2/2008 | Hammad et al. |
| 2008/0086770 A1 | 4/2008 | Kulkarni et al. |
| 2008/0098464 A1 | 4/2008 | Mizah |
| 2008/0151885 A1 | 6/2008 | Hom et al. |
| 2008/0155672 A1 | 6/2008 | Sharma |
| 2008/0250477 A1 | 10/2008 | Samuelsson et al. |
| 2009/0265273 A1 | 10/2009 | Guntupalli et al. |
| 2009/0319360 A1 | 12/2009 | Salemi |
| 2011/0093389 A1 | 4/2011 | Singhal |
| 2012/0265809 A1 | 10/2012 | Hanson et al. |
| 2013/0256403 A1* | 10/2013 | MacKinnon Keith ................... G06Q 30/0637 235/375 |
| 2014/0173695 A1* | 6/2014 | Valdivia ............. H04W 12/06 726/4 |
| 2014/0274384 A1* | 9/2014 | Boswell ............. A63F 13/323 463/31 |
| 2017/0123751 A1* | 5/2017 | Sigurosson ........... G06F 3/0481 |
| 2017/0359723 A1* | 12/2017 | Pal ................... H04W 12/065 |
| 2019/0230165 A1* | 7/2019 | Wang ............... H04L 63/0846 |
| 2019/0364034 A1* | 11/2019 | Alexander ........... H04W 12/06 |

OTHER PUBLICATIONS

Krishnakumar et al., "Seamless session mobility using short range communication technologies," 2014 IEEE International Conference on Communications (ICC) Year: 2014 | Conference Paper | Publisher: IEEE.*

U.S. Appl. No. 12/182,290, filed Jul. 30, 2008, Voutour; Teddy Joseph Edmond.

U.S. Appl. No. 12/182,299, filed Jul. 30, 2008, Voutour; Teddy Joseph Edmond.

Adida, Ben, "FragToken: Secure Web Authentication using the Fragment Identifier," Harvard, 33 Oxford Street, Cambridge MA 02118. Feb. 3, 2007, 20 pages.

USPTO Transaction History for U.S. Appl. No. 12/182,293, filed Jul. 30, 2008, 362 pages.

USPTO Transaction History for U.S. Appl. No. 12/182,299, filed Jul. 30, 2008, 79 pages.

USPTO Transaction History for U.S. Appl. No. 15/003,499, filed Jan. 21, 2016, 164 pages.

USPTO Transaction History for U.S. Appl. No. 15/652,526, filed Jul. 18, 2017, 193 pages.

* cited by examiner

SECURE SESSION SHARING BETWEEN COMPUTING DEVICES

BACKGROUND

A user many own multiple different computing devices such as a personal computer, smartphone, tablet computer, and various internet of things (IoT) devices. In some cases, it may be advantageous to transition a computing session seamlessly from one device to another. In some cases, it may be advantageous to share information contained in a user account between two or more of the user's computing devices. However, sharing user authentication data over a computer network poses a risk that the authentication data may be intercepted by an unauthorized party. Moreover, session or account sharing techniques that authorize sharing between devices based on whether the devices are connected to the same computing network may be susceptible to hacking or malware.

SUMMARY

This specification relates to sharing access to secure content between multiple computing devices.

Implementations of the present disclosure are generally directed to systems and methods for sharing access to secure content between multiple computing devices. More specifically, implementations are directed to a process for authorizing a non-authenticated computing device to access secure user content based on an authenticated session of another computing device. Implementations may provide improved data security over existing techniques by, for example, transferring a machine-readable code (MRC) between the authenticated computing device and the non-authenticated computing device in order to verify the physical presence of the two computing devices near each other.

In general, innovative aspects of the subject matter described in this specification can be embodied in methods that include the actions of authenticating a first computing device to access a secure account. Receiving a request from a second computing device to be authorized to access the secure account. Providing, to the second computing, first data that represents a first machine-readable code for presentation by the second computing device. Receiving, from the first computing device, second data that represents a second machine-readable code as read by the first computing device. Authorizing the second computing device to access the secure account in response to determining that the second data accurately represents the first machine-readable code as sent to the second computing device. Other implementations of this aspect include corresponding systems, apparatus, and computer programs, configured to perform the actions of the methods, encoded on computer storage devices. These and other implementations can each optionally include one or more of the following features.

Some implementations include in response to authorizing the second computing device to access the secure account, providing, to the second computing device, third data that replicates a graphical user interface as displayed on the first computing device.

In some implementations, the first and second machine-readable codes are Quick Response (QR) codes.

In some implementations, the first and second machine-readable codes are sound codes.

In some implementations, the first and second machine-readable codes are near field communication codes.

In some implementations, providing the first data defining the first machine-readable code includes generating the first machine readable code as unique to the request from the second computing device.

In some implementations, the first machine-readable code is associated with an expiration time, and wherein authenticating the second computing device includes determining that the second data is received before the expiration time of the first machine-readable code.

In some implementations, the first computing device is a mobile computing device and the second computing device is a desktop or a laptop computer.

In some implementations, the second computing device is an IoT device.

These and other implementations can each provide one or more advantages. In some examples, implementations of the present disclosure improve the security of migrating a secure account session between different computing devices. Implementations may provide an efficient, but secure process for accessing a secure account from a non-authenticated computing device without requiring a user to login to the account on the non-authenticated computing device. Implementations provide improved processes for providing IoT devices with access to secure user accounts.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
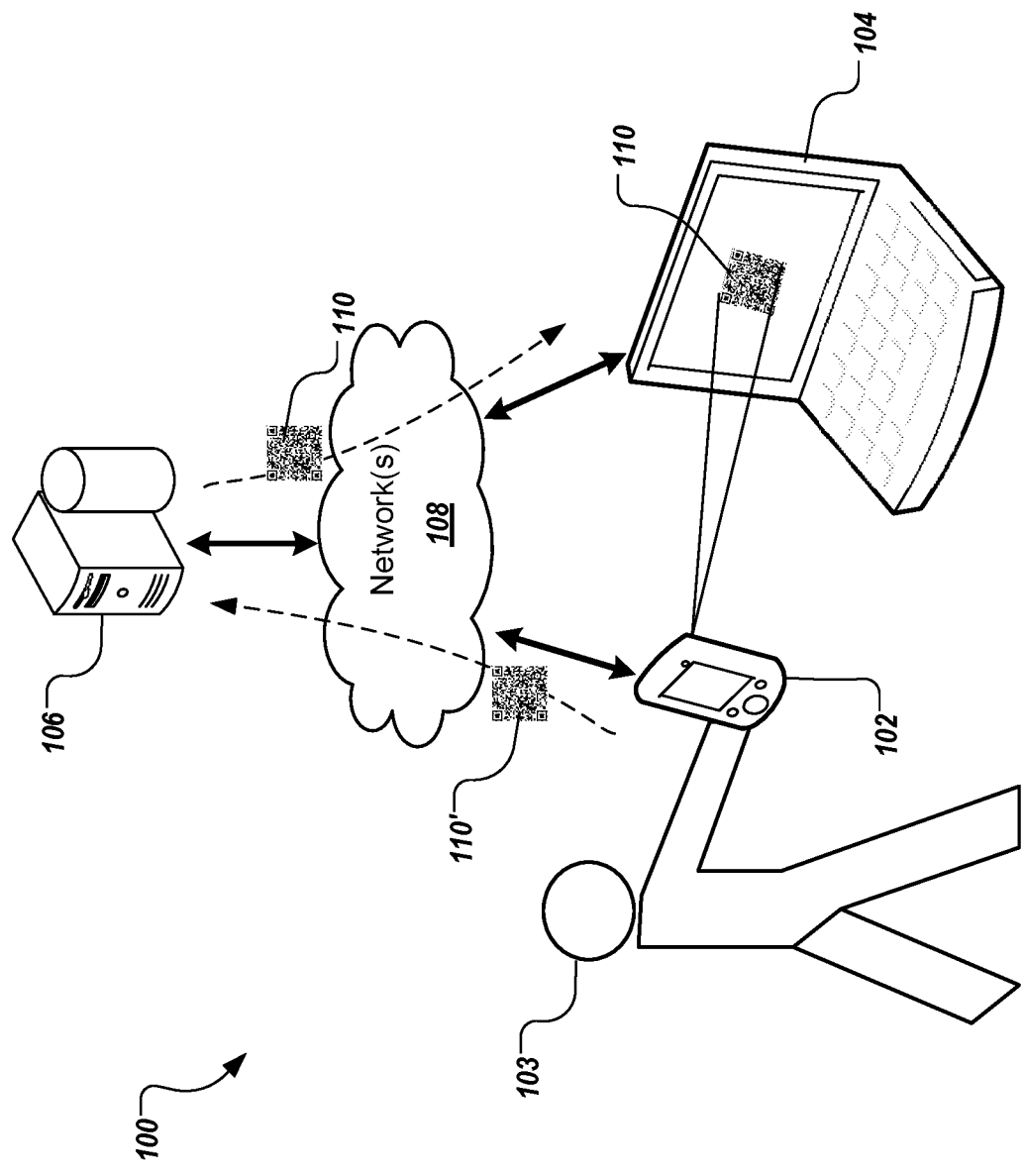
FIG. 1A depicts an example system in accordance with implementations of the present disclosure.

Implementations of the present disclosure are generally directed to systems and methods for sharing access to secure content between multiple computing devices. Implementations of the present disclosure permit a user to migrate a secure computing session from one computing device to another computing device without the need to login to an associated user account on the second computing device. For example, a user may login to a user account (e.g., an online banking account) and begin a secure account session on a first computing device (e.g. a smartphone) with an account server system. Implementations of the present disclosure permit the user to open the user account and establish a secure session on a second computing device (e.g., a laptop computer) based on the active secure session with the first computing device and without the need to login to the account on the second computing device. For example, a user may login to an online banking account on his smartphone to research mortgages. However, it may be cumbersome to complete a complex form on a smartphone. Implementations of the present disclosure would permit the user to continue the mortgage application on the user's laptop by replicating user's online account session from the smartphone onto the user's laptop without requiring the user to login to the account on the laptop and then navigate to the mortgage application page.

Some implementations of the present disclosure permit a user to provide a second computing device (e.g., an IoT device) with access to secure account data through an active secure computing session on the first computing device (e.g., a smartphone). For example, implementations permit the user to establish a secure computing session on an IoT device based on an active secure computing session on the user's smartphone. For example, a user may login to an online banking account on his smartphone and may wish to share account information with a home assistant device so that the user can make online purchases through the home assistant device. Implementations of the present disclosure would permit the user to access the online baking account through the home assistant device based on the user's active secure account session on the smartphone.

More generally, implementations are directed to a process for authorizing a non-authenticated device to access secure user content based on an authenticated session of another computing device. Implementations may provide improved data security over existing techniques by, for example, transferring a machine-readable code (MRC) between the authenticated computing device and the non-authenticated computing device in order to verify the physical presence of the two computing devices near each other. For example, a user may be logged into a secure user account on a smartphone. The user may wish to transition the secure account session over to a different computing device (e.g., a laptop) that is not logged in to the account. According to implementations of the present disclosure the, the laptop computer (e.g., the non-authenticated device) can request authorization to access the user account from the account server based on the active authenticated session on the user's smartphone (e.g., the authenticated computing device). To permit access account access on the user's laptop, the account server sends a MRC to the laptop. The user then captures the MRC from the laptop using the smartphone. The smartphone sends the captured MRC back to the account server (e.g., through the authenticated session). The server will authorize account access on the laptop when it receives the MRC from the smartphone. The transfer of the MRC between the laptop and the smartphone serves to verify that the two computing devices are physically present to each other. For example, using the MRC to verify the physical presence of the two computing devices near each other permits the user's authenticated account access on the smartphone to be shared with the laptop in a secure and efficient manner.

As used herein the terms "secure computing session" and "secure account session" are not limited to a particular network connection between specific devices. The terms are also used to refer to an authenticated access by a first computing device to a secure user account and authorizing a second computing device to access the account based on an active account session but without the need to perform a second login process on the second computing device. For example, sharing a secure computing session or authorizing a second computing device to access a secure computing session refers to permitting a user to access a secure user account on a non-authenticated computing device based on an active account session with an authenticated computing device. For example, the "authenticated computing device" refers to a computing device on which the user logged into the account, and the "non-authenticated computing device" refers to a different computing device on which the user desires to access the account, but on which an active account session is not yet present.

Figure 1B:
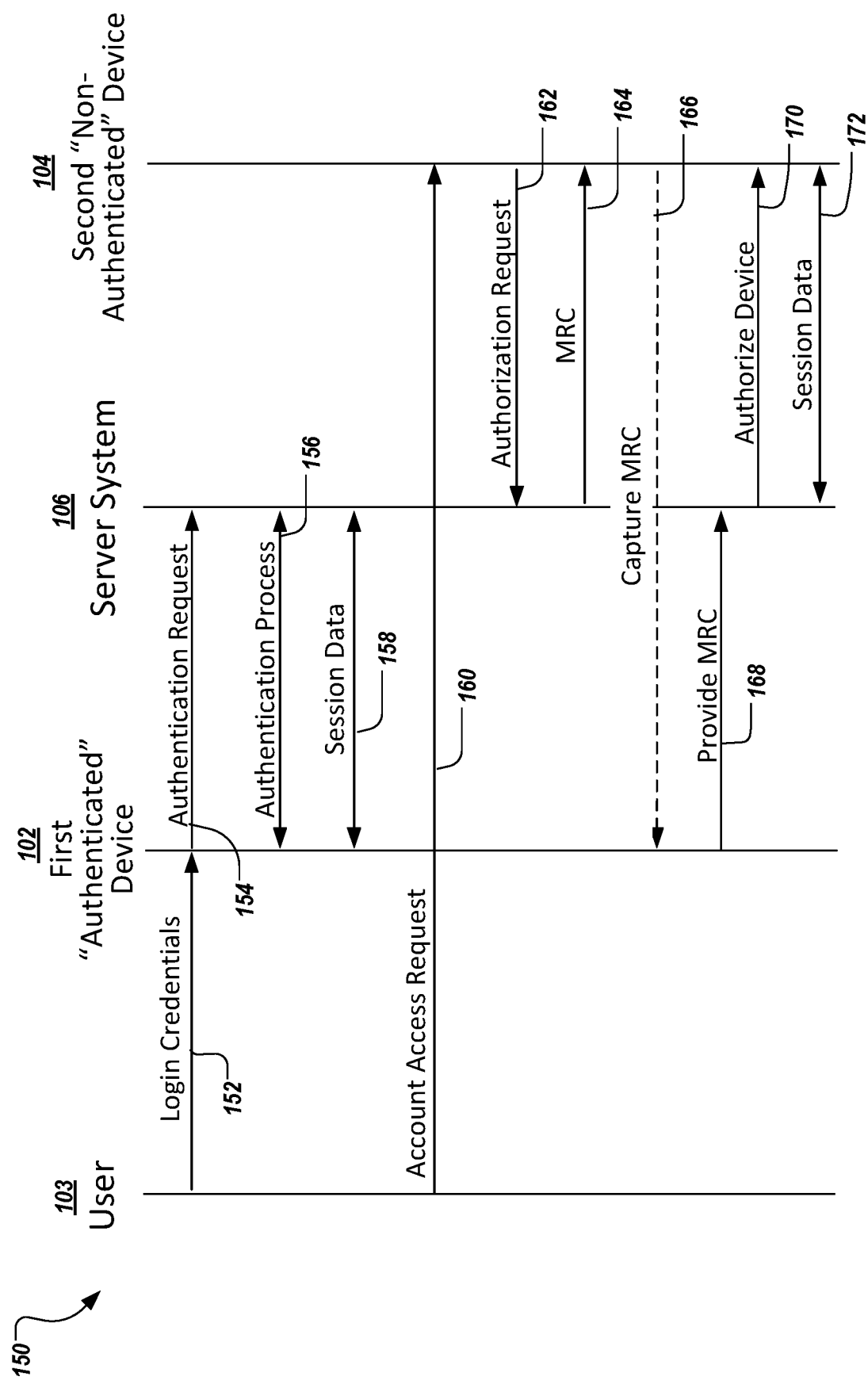
FIG. 1B depicts a swim lane diagram representing operations of the example system in accordance with implementations of the present disclosure.

FIG. 1A depicts an example system 100 that can execute implementations of the present disclosure. FIG. 1B depicts a swim lane diagram 150 representing example operations of the system 100. The system 100 includes two computing devices 102, 104 in communication with one or more server systems 106 over one or more computer networks 108. Each of the computing devices 102, 104 can be, for example, a desktop computer, a laptop computer, a smartphone, a tablet computer, or an IoT device. The IoT devices can include, but are not limited to, home assistants (e.g., Amazon Alexa™, and Google Home™, smart appliances (e.g., washers, dryers, refrigerators, ovens, dishwashers), smart televisions, smart stereo systems, smart home devices (e.g., garage door openers, alarm systems, security systems, smart home systems), and/or portable or less portable computing devices (e.g., electronic book readers, gaming systems, television set-top boxes, in-vehicle automotive computers or telematics devices, etc.). In reference to the implementations described below, computing device 102 is referred to as the authenticated computing device 102 and computing device 104 is referred to as the non-authenticated computing device 104.

The computer networks 108 can include one network or a combination of networks, such as a local area network (LAN), wide area network (WAN), the Internet, a cellular network, a satellite network, or a combination thereof connecting any number of mobile clients, fixed clients, and servers.

The server system 106 can be, for example, a secure data server system such as a user account server system. For example, the server system 106 can be a user account server system that provides access to secure user accounts. For example, the server system 106 can provide access to user accounts including, but not limited to, online banking accounts, online insurance accounts, streaming media accounts, cloud-based data storage accounts, online shopping accounts, document-sharing accounts (e.g., DocuSign™), or government accounts (e.g., U.S. Patent and Trademark accounts).

The server system 106 can authorize a non-authenticated computing device 104 to access secure content by sharing a verified user authentication with an authenticated computing device 102. For example, the server system 106 can include executable software that causes the server system 106 to verify the execution of provisions in electronic contracts according to implementations of the present disclosure. The server system 106 can include one or more servers and one or more data stores coupled to the processors storing the executable software for performing the processes described herein.

The system 100 permits a user 103 to access a secure account on the non-authenticated computing device 104 based on an active secure computing session with the server system 106 on the authenticated computing device 102. For example, in operation, a user 103 establishes a secure session on a first computing device 102, thereby, establishing the computing device 102 as the "authenticated device" 102. The user 103 provides account login credentials to the first computing device 102 (152). Account login credentials can include, but are not limited to, a username and password, a PIN, or biometric login credentials. The first computing device 102 sends an authentication request, e.g., including the login credentials, to the account server system 106 (154). The server system 106 processes the authentication request (156) and permits access to the user's secure account. The first computing device 102 and the server system 106 can exchange additional user credential information during the authentication process 156 (e.g., secure tokens or certificates). Once the server system 106 grants access to the user account, the first computing device 102 and server system 106 can exchange session data (158). In addition, the first computing device is referred to as an authenticated computing device 102 after the server system 106 grants the first computing device 102 access to the user account. The session data can include, but is not limited to, user data contained in the user account (e.g., user banking information, cloud stored data files, etc.), secure documents (e.g., a mortgage application), and secure webpages.

At step (160) the user 103 provides an input to access the user account on a second computing device 104 that is not signed into the user account (e.g., an "non-authenticated device"). As noted above, the second computing device 104 can be a different computing device owned by the user (e.g., a laptop computer). Furthermore, the second computing device 104 is further referred to as the non-authenticated computing device 104. For example, the non-authenticated computing device 104 receives a user input requesting authorization to access the user's account from the server system 106. For example, a home screen for the user account may include an option to login to the account based on an active session on another device (e.g., the authenticated computing device 102). The input can be referred to as an account access request.

In response to receiving the account access request, the non-authenticated computing device 104 sends a request for authorization to access the user's account to the server system 106 (e.g., an authorization request). For example, the authorization request includes data identifying the user or the user account (e.g., a user name, e-mail address, etc.). In some implementations, the authorization request can indicate that the user has an account session active on another computing device. In some implementations, the authorization request can identify the authenticated computing device 102 on which the active session is open. For example, the authentication request can include a unique identifier of the authorized device (e.g., a MAC address) or an identifier stored in a user profile associated with the user account (e.g., a nickname for the authenticated device such as "User X's Smartphone").

The server system 106 generates a MRC 110. For example, the server system 106 can generate an authorization credential that is unique to the particular authorization request received from the non-authenticated computing device 104. The server system 106 can generate the MRC 110 based on the authorization credential. For example, the server system 106 can encode the authorization credential in the MRC 110. In some examples, the authorization credential is an alphanumeric code that is unique to the authorization request. For example, the authorization credential can be a pseudo random code that is generated in response to the authorization request.

For example, the MRC 110 can be an optical machine-readable code, sound-based machine-readable code, or an electromagnetic machine-readable code (e.g., a Near-Field Communication (NFC) signal). For example, an optical MRC encodes data such as an alphanumeric authorization credential in a spatially varying graphical code (e.g., a QR code or a bar code). An optical MRC can be displayed on one computing device and captured by scanning the MRC with another computing device to obtain an image of the code (e.g., by a camera). For example, sound-based MRC can be a sound signal that is modulated to encode data such as an alphanumeric authorization credential. The sound signal representation of the credential can be output through a speaker of a computing device and received by a microphone of another computing device. For example, an electromagnetic MRC can encode data such as an alphanumerical authorization credential in an NFC signal generated by one computing device and received by an NFC reader on another computing device.

In some implementations, the server system 106 can transmit the MRC 110. For example, the server system 106 can transmit an image of an optical MRC (e.g., a QR code or a bar code) or a sound file of a sound-based MRC. In some implementations, the server system 106 can transmit the authorization credential that is to be encoded in a MRC and the non-authenticated computing device 104 can generate the MRC 110. For example, the server system 106 can transmit a set of alphanumeric characters that represent the authorization credential. The non-authenticated computing device 104 can generate a MRC (e.g., a QR code, sound code, or NFC) that encodes the alphanumeric characters.

The non-authenticated computing device 104 presents the MRC 110 to the authenticated device. The authenticated computing device 102 captures the MRC 110 presented by the non-authenticated device (166). For example, the user 103 can scan an optical MRC (e.g., a QR code) presented on a display of the non-authenticated computing device 104 by capturing an image of the MRC 110 with a camera on the authenticated computing device 102. In some examples, the user 103 can capture a sound-based MRC by holding the microphone of the authenticated computing device 102 near a speaker on the non-authenticated devices 104 as the non-authenticated device produces the sound-based MRC 110. In some examples, the user 103 can capture a NFC signal by holding the authenticated computing device 102 near the non-authenticated devices 104 as the non-authenticated device produces the NFC signal.

The authenticated computing device 102 provides the captured version of the MRC 110' to the server system 106 for validation (168). For example, the authenticated computing device 102 can transmit the captured MRC 110' itself. For example, the authenticated computing device 102 can transmit an image of an optical MRC (e.g., a QR code or a bar code) or a sound file of a recorded sound-based MRC. In some implementations, the authenticated computing device 102 can decode the captured MRC 110' and transmit the authorization credential that was encoded by the MRC to the server system 106. In some examples, the authenticated computing device 102 transmits the captured MRC 110' to the server system 106 through the secure account session.

The server system 106 receives the captured MRC 110' (168). The server system 106 determines whether to authorize the non-authenticated computing device 104 to access the user account based on the captured MRC 110'. For example, the server system 106 determines whether the captured MRC 110' accurately represents the MRC 110 that the server system 106 transmitted to the non-authenticated computing device 104. For example, the server system 106 can compare the captured MRC 110' from the authenticated computing device 102 to the MRC 110 that was sent to the non-authenticated computing device 104. The server system 106 authorizes the non-authenticated computing device 104 to access the user account (170) if the captured MRC 110' accurately represents the MRC 110 that was sent to the non-authenticated computing device 104.

In some implementations, the server system 106 decodes the captured MRC 110' to obtain the authorization credential. The server system 106 can validate the authorization credential encoded by the captured MRC 110' by comparing it to the authorization credential that the server system 106 generated and encoded in the MRC 110 that was sent to the non-authenticated computing device 104. If the authentication credential encoded in the captured MRC 110' matches the authentication credential that the server system generated and encoded in the MRC 110 sent to the non-authenticated computing device 104, then the server system 106 can authorize the non-authenticated computing device 104 to access the user account (170).

In some implementations, the server system 106 receives the authorization credential from the authenticated computing device 102. In such implementations, the server system 106 authorizes the non-authenticated computing device 104 to access the user account by validating the authorization credential received from the authenticated computing device 102.

When the server system 106 authorizes the non-authenticated computing device 104 to access the user account, non-authenticated computing device 104 and server system 106 can exchange session data (172). For example, the exchange of the MRC 110 between the non-authenticated device 14 and the authorized computing device 102 serves as a means for verifying that the access request from the non-authenticated computing device 104 is a valid request, and not an attempt to hack into the user's account through the non-authenticated computing device 104. For example, the session data can include, but is not limited to, user data contained in the user account (e.g., user banking information, cloud stored data files, etc.), secure documents (e.g., a mortgage application), and secure webpages.

In some implementations, the server system 106 can send session data to the non-authenticated computing device 104 to replicate the data accessed by the authenticated computing device 102 through its active secure session. For example, the server system 106 can send session data to replicate a graphical user interface displayed on the authenticated computing device 102 on the non-authenticated computing device 104. For example, if the authenticated computing device 102 has a fillable form open in its account session, the server system 106 can send the non-authenticated computing device 104 a link to an interface that displays the same form (e.g., a mortgage application). In some implementations, the server system 106 can send data to replicate the form on the non-authenticated computing device 104 in the same state that the form is displayed on the authenticated computing device 102. For instance, if the user 103 had partially completed the form on the authenticated computing device 102, the server system can transmit the completed data to the non-authenticated computing device 104 so that the form displayed on the non-authenticated computing device 104 includes the information that the user 103 had already completed. In some implementations, the server system 106 automatically sends the non-authenticated computing device 104 session data to replicate the interface displayed on the authenticated computing device 102 in response to the non-authenticated computing device 104 being authorized to access the user account.

In some implementations, the server system 106 generates the MRC 110 with an expiration time. For example, the server system 106 can associate an expiration time with the MRC 110 when the MRC is generated. For example, the expiration time can be, but is not limited to, minutes or hours after the MRC 110 is generated. In such implementations, the server system 106 can verify that the captured MRC 110' is received prior to the expiration time before authorizing the non-authenticated computing device 104 to access the user account. For example, the expiration time can be used to prevent attempts to copy and fraudulently use of the MRC 110 at a later time to gain access to the user account.

In some implementations, the server system 106 can associate the expiration time with the authorization credential that is encoded in the MRC 110. For example, in implementations where the server system 106 does not directly generate the MRC 110, but generates the authorization credential and sends the authorization credential to the non-authorized computing device 104 to generate the MRC 110 from the authorization credential, the server system 106 can associate the expiration time with the authorization credential.

The MRC 110 serves to verify that the non-authenticated device is physically present to the authenticated device because the MRC 110 requires direct short-range interactions between the two devices. The transfer of the MRC between the non-authenticated computing device 104 and the authenticated computing device 102 may provide improved security for authorizing account access to the non-authenticated device, because it may be difficult, if not impossible, to replicate the MRC on the authenticated computing device 102 without being physically present to the non-authenticated computing device 104. In addition, the MRC 110 may serve as a verification that the same user who correctly supplied authentication credentials to login to the user account on the authenticated computing device 102 is also physically present with the non-authenticated computing device 104, thereby, reducing the risk associated with fraudulent account access requests.

Figure 2A:
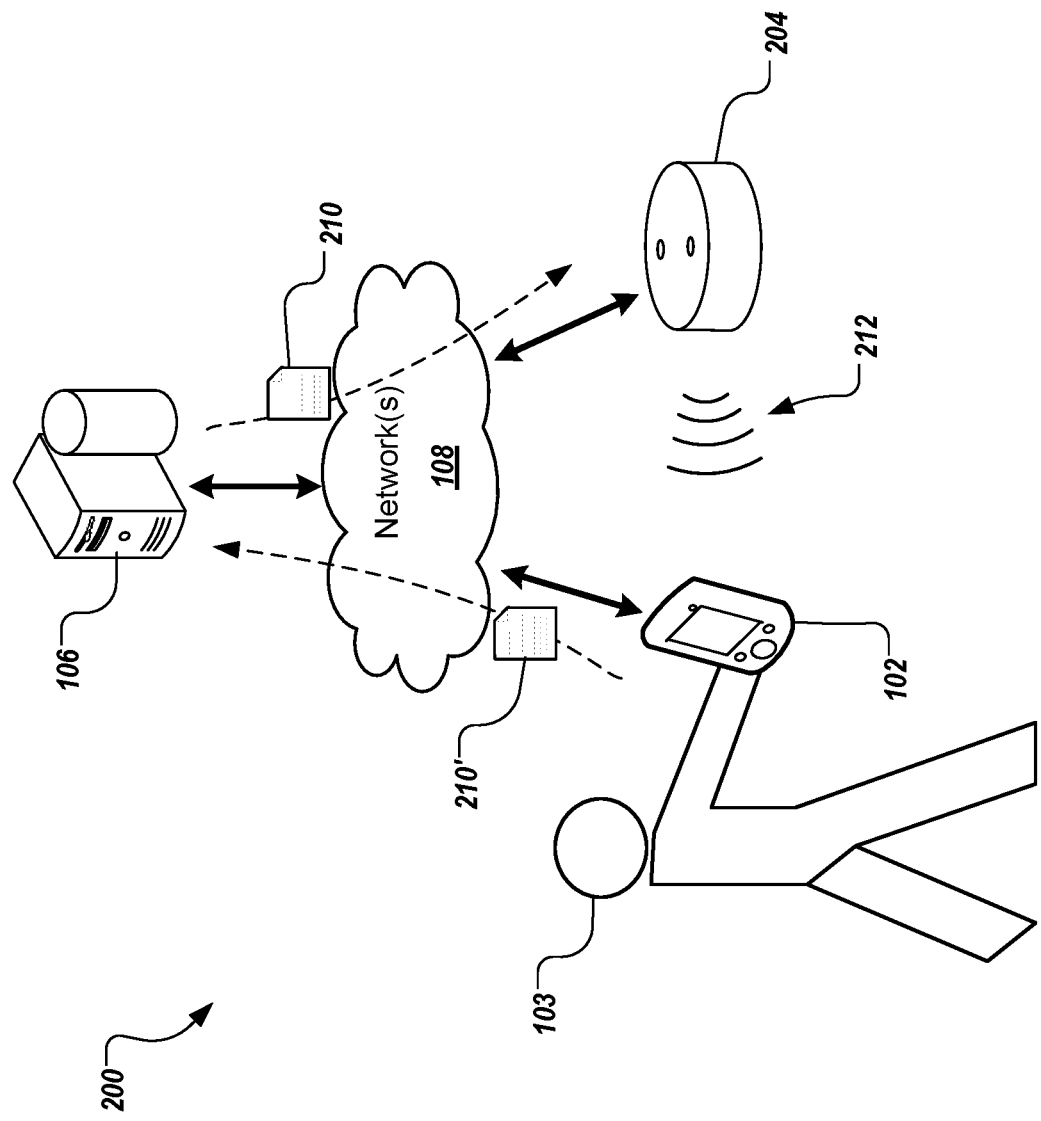
FIG. 2A depicts a second example system in accordance with implementations of the present disclosure.
Figure 2B:
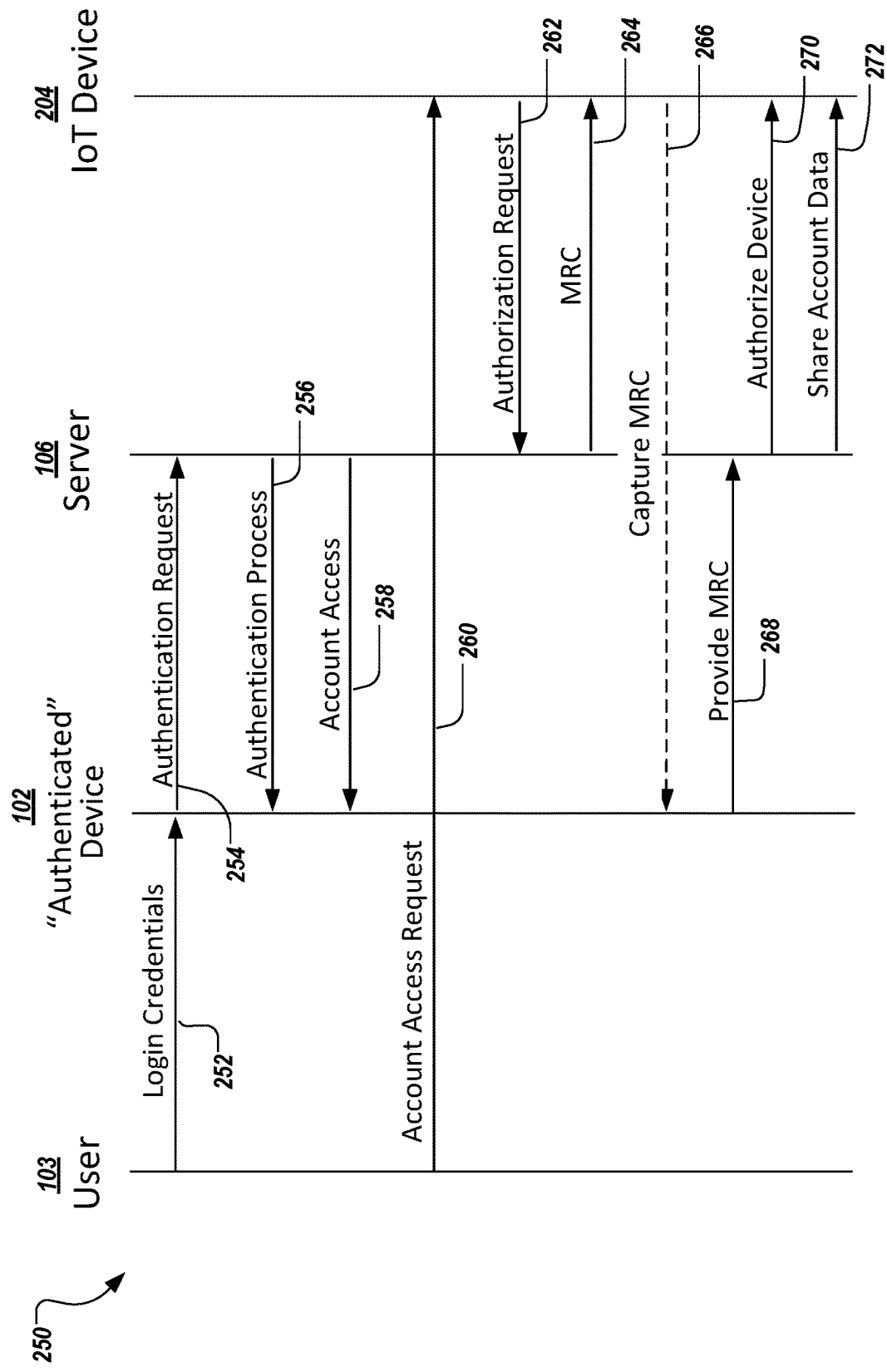
FIG. 2B depicts a swim lane diagram representing operations of the second example system in accordance with implementations of the present disclosure.

FIG. 2A depicts an example system 200 that can execute implementations of the present disclosure. FIG. 2B depicts a swim lane diagram 250 representing example operations of the system 200. FIGS. 2A and 2B illustrate the operation of a system 200 that is similar to the system 100 described above in reference to FIGS. 1A and 1B, but in the context of sharing access to a user account with an IoT device 204. The components and operation of the system 200 are similar to those discussed above in reference to the system 100.

In the example context depicted in FIG. 2A, the IoT device is represented and described as a home assistant device. However, implementations of the present disclosure may be performed in conjunction with other IoT devices, e.g., smart appliances, smart televisions, or streaming media players. For example, IoT devices may have limited input capabilities which makes them difficult for a user to enter account login credentials directly on the IoT device. For instance, home assistant devices may only receive input by voice commands. Entering a user password (e.g., one that contains special characters) may be difficult and error prone using voice commands. Furthermore, it may be generally ill advised to provide an account password audibly.

Implementations of the present disclosure may serve as an improved process for granting authorization for an IoT device to access a user account. For example, the server system 106 can authorize the IoT device 204 to access secure content by sharing a verified user authentication with an authenticated computing device 102. The system 200 permits a user 103 to grant access to a secure account by the IoT device 204 based on an active secure computing session with the server system 106 on the authenticated computing device 102. The operation steps 252-258 as shown in FIG. 2B are similar to steps 152-158, described above.

The user 103 provides account login credentials to the first computing device 102 (252). Account login credentials can include, but are not limited to, a username and password, a PIN, or biometric login credentials. The first computing device 102 sends an authentication request, e.g., including the login credentials, to the account server system 106 (254). The server system 106 processes the authentication request (256) and permits access to the user's secure account. Once the server system 106 grants access to the user account, the first computing device 102 and server system 106 can exchange session data (258). Furthermore, the first computing device is referred to as an authenticated computing device 102 after the server system 106 grants the first computing device 102 access to the user account.

At step (260) the user 103 provides an input to access the user account on the IoT device 204. For example, the user 103 may provide a voice command to request access to the user's account, which is received by the IoT device 204. For example, the user input can identify the type of account (e.g., by reference to a website) and the user's account identity (e.g., by a user name, e-mail address, etc.). In response to receiving the account access request, the IoT device 204 sends a request for authorization to access the users account to the server system 106 (e.g., an authorization request). For example, the authorization request includes data identifying the user or the user account (e.g., a user name, e-mail address, etc.). In some implementations, the authorization request can indicate that the user has an account session active on another computing device. In some implementations, the authorization request can identify the authenticated computing device 102 on which the active session is open. For example, the authentication request can include an identifier stored in a user profile associated with the user account (e.g., a nickname for the authenticated device such as "User X's Smartphone").

The server system 106 generates a MRC 210. For example, the server system 106 can generate an authorization credential that is unique to the particular authorization request received from the IoT device 204. The server system 106 can generate the MRC 210 based on the authorization credential. For example, the server system 106 can encode the authorization credential in the MRC 210. In some implementations, the server system 106 can encode the authorization credential in a type of MRC 210 based on the output capabilities of the IoT device 204. For example, when communicating with a home assistant device, the server system can encode the authorization credential in a sound-based MRC 210.

The server system 106 sends the MRC 110 to the IoT device 204 (264). In some implementations, the server system 106 can transmit the MRC 210 itself. For example, the server system 106 can transmit a sound file of a sound-based MRC 210. In some implementations, the server system 106 can transmit the authorization credential that to be encoded in a MRC and the IoT device 204 can generate the MRC 210. For example, the server system 106 can transmit a set of alphanumeric characters that represent the authorization credential. The IoT device 204 can generate a sound code that encodes the alphanumeric characters.

The IoT device 204 presents the MRC 210 to the authenticated device. The authenticated computing device 102 captures the MRC 210 (e.g., sound signal 212) presented by the IoT device 204 (266). For example, the user 103 can capture a sound-based MRC by holding the microphone of the authenticated computing device 102 near a speaker on the IoT devices 204 as the IoT device 204 produces the sound signal 212.

The authenticated computing device 102 provides the captured version of the MRC 210' to the server system 106 for validation (268). For example, the authenticated computing device 102 can transmit a sound file of the recorded sound signal from the IoT device 204 to the server system 106. In some implementations, the authenticated computing device 102 can decode the captured MRC 210' and transmit the authorization credential that was encoded by the MRC to the server system 106. In some examples, the authenticated computing device 102 transmits the captured MRC 210' to the server system 106 through the secure account session.

The server system 106 receives the captured MRC 210' (268). The server system 106 determines whether to authorize the IoT device 204 to access the user account based on the captured MRC 210.' For example, the server system 106 determines whether the captured MRC 210' accurately represents the MRC 210 that the server system 106 transmitted to the IoT device 204. For example, the server system 106 can compare the captured MRC 210' from the authenticated computing device 102 to the MRC 210 that was sent to the IoT device 204. The server system 106 authorizes the IoT device 204 to access the user account (270) if the captured MRC 210' accurately represents the MRC 210 that was sent to the IoT device 204.

In some implementations, the server system 106 decodes the captured MRC 210' to obtain the authorization credential. The server system 106 can validate the authorization credential encoded by the captured MRC 210' by comparing it to the authorization credential that the server system 106 generated and encoded in the MRC 210 that was sent to the IoT device 204. If the authentication credential encoded in the captured MRC 210' matches the authentication credential that the server system generated and encoded in the MRC 210 sent to the IoT device 204, then the server system 106 can authorize the IoT device 204 to access the user account (270).

In some implementations, the server system 106 receives the authorization credential from the authenticated computing device 102. In such implementations, the server system 106 authorizes the IoT device 204 to access the user account by validating the authorization credential received from the authenticated computing device 102.

When the server system 106 authorizes the IoT device 204 to access the user account, the IoT device 204 and server system 106 can exchange account data (272). For example, the exchange of the MRC 210 between the IoT device 204 and the authorized computing device 102 serves as a means for verifying that the access request from the IoT device 204 is a valid request, and not an attempt to hack into the user's account through the IoT device 204. For example, account data can include payment information from an ogling banking account to permit purchases through the IoT device 204; streaming media from the user's streaming media account to permit the IoT device to play the media; or media files stored on the user's cloud storage account.

Figure 3:
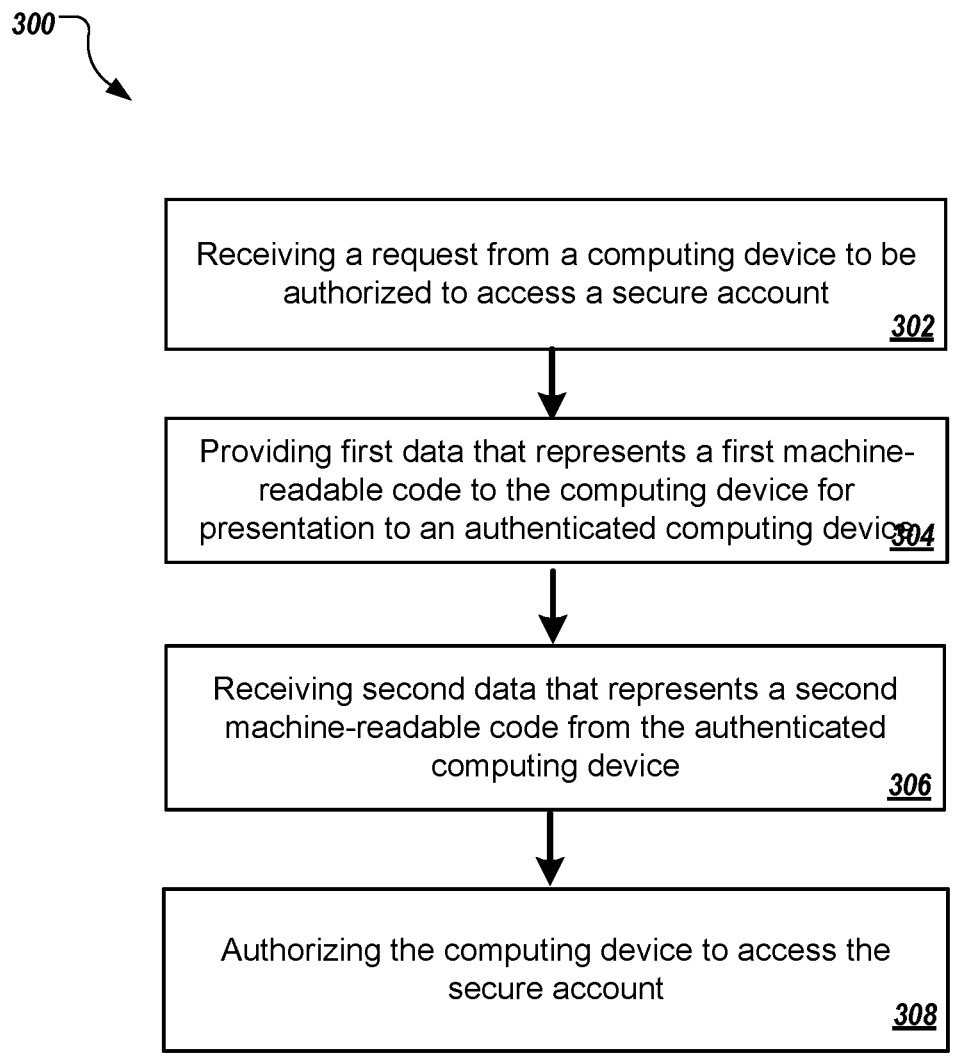
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the example server system 106 of FIGS. 1A-2B. In some examples, the example process 300 can be provided by one or more computer-executable programs executed using one or more computing devices. For example, the example process 300, or portions thereof, can be provided by one or more programs executed by a computing system (e.g., server system 106).

The server system receives a request from a computing device to be authorized to access a secure account (302). For example, the server system 106 can receive a request from a non-authenticated computing device to access a user account. The request can include data identifying the user account including, but not limited to, a username, e-mail address, account number, or a combination thereof. In some implementations, the request can include an indication that an authenticated account session is currently active on another computing device (e.g., an authenticated computing device) that is associated with the same user.

The server system provides first data that represents a first machine-readable code to the non-authenticated computing device for presentation to an authenticated computing device (304). For example, the server system can generate an MRC that is unique to the access request from the computing device. In some examples, the MRC encodes an authorization credential such as a pseudorandom code generated in response to the request from the computing device. In some implementations, the server system associates an expiration time with the MRC, the authorization credential, or both. For example, the MRC can include a time stamp indicating when it was generated. The MRC may expire after a pre-defined period of time from when it was generated.

The server system receives second data that represents a second MRC from the authenticated computing device (306). For example, the second data represents the MRC sent to the non-authenticated computing device and as captured by the authorized computing device. The server system authorizes the non-authenticated computing device to access the secure account (308). For example, the server system authorizes the non-authenticated computing device to access the secure account based on determining whether the second MRC that was received from the authenticated computing device accurately represents the first MRC sent to the non-authenticated device. On the other hand, the server system does not authorize the non-authenticated computing device to access the secure account if the second MRC does not accurately represent the first MRC.

In some implementations, the server system automatically provides the non-authenticated computing device with data that replicates a graphical user interface as displayed on the authenticated computing device in response to authorizing the non-authenticated computing device to access the secure computing account.

Figure 4:
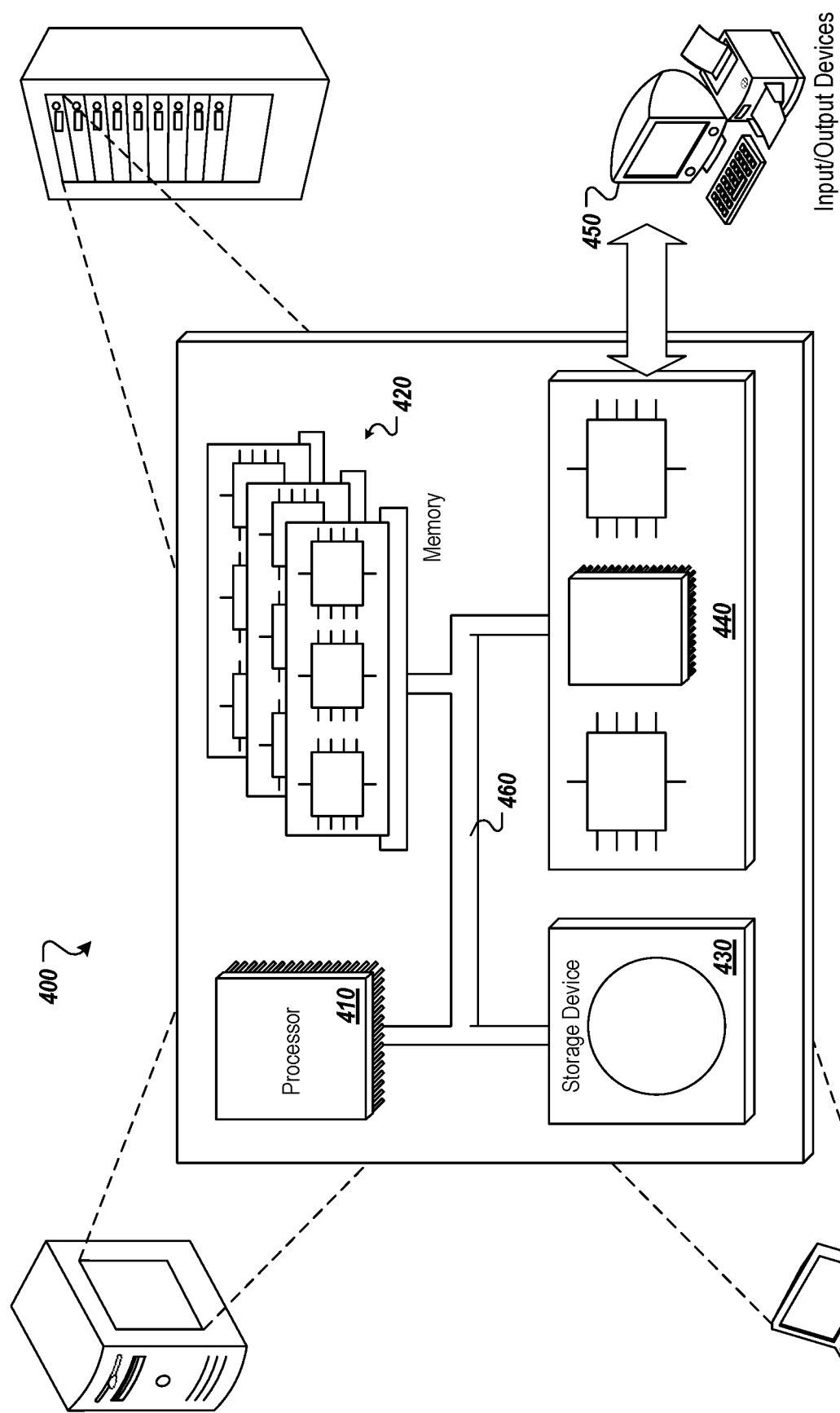
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the computing devices 102, 104 or the server system 106, and/or other computing device(s) or system(s) described herein. The system 400 may include one or more processors 410, a memory 420, one or more storage devices 430, and one or more input/output (I/O) devices 450 controllable via one or more I/O interfaces 440. The various components 410, 420, 430, 440, or 450 may be interconnected via at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. For example, the processor(s) 410 may execute instructions for the various software module(s) described herein. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more communication networks using any network protocol.

Computing devices of the system 400 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to a suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS)

receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for authorizing access to secure content, the method comprising:
    authenticating, by a server system, a first computing device to access a secure account and establish an account session between the first computing device and the server system;
    receiving, by the server system, a request from a second computing device to be authorized to access the secure account, wherein, when the request is received, the second computing device is a non-authenticated computing device, wherein the request includes an indication of the established account session between the first computing device and the server system, the indication including a unique identifier of the first computing device;
    providing, to the second computing device by the server system, first data that represents a first machine-readable code for presentation by the second computing device;
    receiving, from the first computing device through the account session, second data that represents a second machine-readable code as read by the first computing device; and
    authorizing, by the server system, the second computing device to access the secure account in response to determining that the second data accurately represents the first machine-readable code as sent to the second computing device.

2. The method of claim 1, further comprising in response to authorizing the second computing device to access the secure account, providing, to the second computing device, third data that replicates a graphical user interface as displayed on the first computing device.

3. The method of claim 1, wherein the first and second machine-readable codes are Quick Response (QR) codes.

4. The method of claim 1, wherein the first and second machine-readable codes are sound codes.

5. The method of claim 1, wherein the first and second machine-readable codes are near field communication codes.

6. The method of claim 1, wherein providing the first data defining the first machine-readable code comprises generating the first machine-readable code as unique to the request from the second computing device.

7. The method of claim 1, wherein the first machine-readable code is associated with an expiration time, and wherein authenticating the second computing device comprises determining that the second data is received before the expiration time of the first machine-readable code.

8. The method of claim 1, wherein the first computing device is a mobile computing device and the second computing device is a desktop or a laptop computer.

9. The method of claim 1, wherein the second computing device is an IoT device.

10. A system comprising:
a server system comprising at least one processor; and at least one data store coupled to the at least one processor having instructions stored thereon which, when executed by the at least one processor, causes the at least one processor to perform operations comprising:
authenticating a first computing device to access a secure account and establish an account session between the first computing device and the server system;
receiving an account access request from a second computing device to be authorized to access the secure account, wherein, when the request is received, the second computing device is a non-authenticated computing device, wherein the account access request includes an indication of the established account session between the first computing device and the server system, the indication including a unique identifier of the first computing device;
providing, to the second computing device, first data defining a first machine-readable code for presentation by the second computing device;
receiving, from the first computing device through the account session, second data that represents a second machine-readable code as read by the first computing device; and
authorizing the second computing device to access the secure account in response to determining that the second data accurately represents the first machine-readable code as sent to the second computing device.

11. The system of claim 10, wherein the operations further comprise in response to authorizing the second computing device to access the secure account, providing, to the second computing device, third data that replicates a graphical user interface as displayed on the first computing device.

12. The system of claim 10, wherein the first and second machine-readable codes are Quick Response (QR) codes.

13. The system of claim 10, wherein the first and second machine-readable codes are sound codes.

14. The system of claim 10, wherein the first and second machine-readable codes are near field communication codes.

15. The system of claim 10, wherein providing the first data defining the first machine-readable code comprises generating the first machine-readable code as unique to the request from the second computing device.

16. The system of claim 10, wherein the first machine-readable code is associated with an expiration time, and wherein authenticating the second computing device comprises determining that the second data is received before the expiration time of the first machine-readable code.

17. The system of claim 10, wherein the second computing device is an IoT device.

18. A non-transitory computer readable storage medium storing instructions that, when executed by at least one processor of a server system, cause the at least one processor to perform operations comprising:
authenticating a first computing device to access a secure account and establish an account session between the first computing device and the server system;
receiving an account access request from a second computing device to be authorized to access the secure account, wherein, when the request is received, the second computing device is a non-authenticated computing device, wherein the account access request includes an indication of the established account session between the first computing device and the server system, the indication including a unique identifier of the first computing device;
providing, to the second computing device, first data defining a first machine-readable code for presentation by the second computing device;
receiving, from the first computing device through the account session, second data that represents a second machine-readable code as read by the first computing device; and
authorizing the second computing device to access the secure account in response to determining that the second data accurately represents the first machine-readable code as sent to the second computing device.

19. The medium of claim 18, wherein the operations further comprise in response to authorizing the second computing device to access the secure account, providing, to the second computing device, third data that replicates a graphical user interface as displayed on the first computing device.

* * * * *